UNITED STATES PATENT OFFICE.

KURT GOTTLOB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,149,577.     Specification of Letters Patent.     Patented Aug. 10, 1915.

No Drawing.     Application filed January 6, 1913. Serial No. 740,390.

*To all whom it may concern:*

Be it known that I, KURT GOTTLOB, doctor of philosophy, chemist, citizen of the Empire of Austria-Hungary, residing at Elberfeld, Germany, have invented new and useful Improvements in New Caoutchouc Substances and Processes of Making Same, of which the following is a specification.

In British Letters Patents 15254 of 1910, 17734 of 1910, 25850 of 1910 the production of caoutchouc substances has been described by subjecting butadiene or its homologues or analogues either by themselves or in the presence of diluents or solvents or of agents promoting polymerization to the action of heat.

I have now found that superior results can be obtained if the said hydrocarbons are emulsified or intimately mixed during the process of polymerization with aqueous colloidal solutions of organic substances, such as solutions of egg albumen, of starch, of gelatin, etc. They yield by this treatment products in which the caoutchouc substances are contained in a similar condition to that of the natural caoutchouc in the latex and they can be separated from the emulsions in a similar way as the natural caoutchouc is separated from the latex. The technical advantages arising from this process consist in the improved properties of the caoutchouc substances thus obtained. During the process the emulsification or continuous stirring causes a more uniform intermixture and distribution of the colloidal solutions, and an intermixture and distribution of the rubber during its formation with such solutions and with the unchanged hydrocarbons, thus giving a novel resulting product having peculiar latex-like properties, comparable with the natural latex of rubber-producing plants. They are very tenacious, elastic and very little sticky and they can be worked more easily and more satisfactory in their further application. They are normally free from resin but contain the organic substance *e. g.* starch, albumen, etc., intimately incorporated therewith, and also contain small amounts of the monomeric butadiene hydrocarbon and of the dimeric hydrocarbon derived from the latter.

In order to illustrate the new process more fully the following example is given, the parts being by weight:—In an autoclave a solution of 7 parts of albumen of eggs (starch or gelatin) in 500 parts of water is heated with 300 parts of isoprene for some weeks to 60° C., the mixture being continuously stirred. A latex like liquid is obtained from which the caoutchouc substance gradually separates while the egg albumen coagulates. The resulting product is a caoutchouc-like polymerization product, normally free from resin, but containing the albumen or other organic substance intimately combined and distributed throughout its mass and containing also small amounts of unpolymerized isoprene, and dipentene, formed during the process.

Alkali may be present during the process of polymerization. In this case however the caoutchouc substances separate only after acidulation of the product of the reaction.

Other colloidal liquids, such as blood serum, milk, etc., can be used or other of the above mentioned hydrocarbons *e. g.* erythrene, 1.3-dimethylbutadiene, etc., or mixtures thereof.

I claim:—

1. The process of producing a caoutchouc substance which comprises polymerizing a butadiene hydrocarbon in the presence of an aqueous colloidal solution of an organic substance sufficient in amount to give with the caoutchouc substance formed a latex-like product and containing a small amount of the organic substance in a large amount of water, emulsifying the mixture during the polymerization to form such latex-like product and finally separating the caoutchouc substance, substantially as described.

2. The process of producing a caoutchouc substance which comprises polymerizing a butadiene hydrocarbon in an aqueous solution of albumen of eggs containing a small amount of the albumen in a large amount of water, emulsifying the mixture during the polymerization and finally separating the caoutchouc substance, substantially as described.

3. The process of producing a caoutchouc substance which comprises polymerizing isoprene in the presence of an aqueous colloidal solution of an organic substance sufficient in amount to give with the caoutchouc substance formed a latex-like product and containing a small amount of the organic substance in a large amount of water, emulsifying the mixture during the polymerization to form such latex-like product and finally separating the caoutchouc substance, substantially as described.

4. The process of producing a caoutchouc substance which comprises polymerizing isoprene in an aqueous solution of albumen of eggs containing a small amount of the albumen in a large amount of water, emulsifying the mixture during the polymerization and finally separating the caoutchouc substance, substantially as described.

5. The process of producing a caoutchouc substance combined intimately with an organic substance which comprises emulsifying a butadiene hydrocarbon with an aqueous colloidal solution of an organic substance sufficient in amount to give with the caoutchouc-substance formed a latex-like product and containing a small amount of the organic substance in a large amount of water, polymerizing such hydrocarbon in such admixture and continuing the emulsification during the polymerization, and finally separating the caoutchouc substance, substantially as described.

6. The process of producing a caoutchouc substance combined intimately with an organic substance which comprises emulsifying isoprene with an aqueous colloidal solution of an organic substance sufficient in amount to give with the caoutchouc-substance formed a latex-like product and containing a small amount of the organic substance in a large amount of water, polymerizing such hydrocarbon in such admixture and continuing the emulsification during the polymerization, and finally separating the caoutchouc substance, substantially as described.

7. The process of producing a caoutchouc substance which comprises polymerizing a butadiene hydrocarbon in admixture with an aqueous solution of an albumen sufficient in amount to give with the caoutchouc substance formed a latex-like product and containing a small amount of the albumen in a large amount of water, emulsifying the mixture during the polymerization, and finally separating the caoutchouc substance, substantially as described.

8. The process of producing a caoutchouc substance combined intimately with a protein which comprises emulsifying a butadiene hydrocarbon with an aqueous colloidal solution of a protein sufficient in amount to give with the caoutchouc-substance formed a latex-like product and containing a small amount of the protein in a large amount of water, polymerizing such hydrocarbon in such admixture and continuing the emulsification during the polymerization, and finally separating the caoutchouc substance, substantially as described.

9. The process of producing a caoutchouc substance combined intimately with a protein which comprises emulsifying isoprene with an aqueous colloidal solution of a protein sufficient in amount to give with the caoutchouc-substance formed a latex-like product and containing a small amount of the protein in a large amount of water, polymerizing such hydrocarbon in such admixture and continuing the emulsification during the polymerization, and finally separating the caoutchouc substance, substantially as described.

10. The process of producing a caoutchouc substance which comprises polymerizing isoprene in admixture with an aqueous solution of an albumen sufficient in amount to give with the caoutchouc substance formed a latex-like product and containing a small amount of the albumen in a large amount of water, emulsifying the mixture during the polymerization, and finally separating the caoutchouc substance, substantially as described.

11. The process of producing a caoutchouc substance which comprises polymerizing a butadiene hydrocarbon in the presence of an aqueous colloidal solution of an organic substance containing a small percentage of such substance in an amount of water greater than the amount of the hydrocarbon, emulsifying the mixture during the polymerization, and finally separating the caoutchouc substance, substantially as described.

12. The process of producing a caoutchouc substance which comprises polymerizing a butadiene hydrocarbon in the presence of an aqueous colloidal solution of an albumen containing a small percentage of such albumen in an amount of water greater than the amount of the hydrocarbon, emulsifying the mixture during the polymerization, and finally separating the caoutchouc substance, substantially as described.

13. The process of producing a caoutchouc substance which comprises polymerizing isoprene in the presence of an aqueous colloidal solution of an organic substance containing a small percentage of such substance in an amount of water greater than the amount of the hydrocarbon, emulsifying the mixture during the polymerization, and finally separating the caoutchouc, substantially as described.

14. The process of producing a caoutchouc substance which comprises polymerizing isoprene in the presence of an aqueous colloidal solution of an albumen containing a small percentage of such albumen in an amount of water greater than the amount of the hydrocarbon, emulsifying the mixture during the polymerization, and finally separating the caoutchouc substance, substantially as described.

15. The process of producing a caoutchouc substance which comprises mixing a butadiene hydrocarbon with an aqueous colloidal solution of an organic substance containing a small percentage of such substance in an amount of water greater than the amount of the hydrocarbon, polymerizing such hydrocarbon in admixture therewith, and finally separating the caoutchouc substance, substantially as described.

16. The process of producing a caoutchouc substance which comprises mixing a butadiene hydrocarbon with an aqueous colloidal solution of an albumen containing a small percentage of such albumen in an amount of water greater than the amount of the hydrocarbon, and finally separating the caoutchouc substance, substantially as described.

17. The process of producing a caoutchouc substance which comprises mixing isoprene with an aqueous colloidal solution of an organic substance, containing a small percentage of such substance in an amount of water greater than the amount of the hydrocarbon, polymerizing such hydrocarbon in admixture therewith, and finally separating the caoutchouc substance, substantially as described.

18. The process of producing a caoutchouc substance which comprises mixing isoprene with an aqueous colloidal solution of an albumen containing a small percentage of such albumen in an amount of water greater than the amount of the hydrocarbon, polymerizing such hydrocarbon in admixture therewith, and finally separating the caoutchouc substance, substantially as described.

19. As a new article of manufacture, a latex-like synthetic caoutchouc substance being a polymerization product of a butadiene hydrocarbon, normally free from resin, containing finely divided organic colloidal substances distributed intimately throughout its mass incorporated therewith from aqueous colloidal solutions during its production, and containing in small amounts the monomeric butadiene hydrocarbon, and a dimeric polymerid of such hydrocarbon.

20. As a new article of manufacture, a latex-like synthetic caoutchouc substance, being a polymerization product of isoprene, normally free from resin, containing finely divided organic colloidal substances distributed intimately throughout its mass incorporated therewith from aqueous colloidal solutions during its production, and containing in small amounts unpolymerized isoprene and a dimeric polymerid of isoprene.

21. As a new article of manufacture, a latex-like synthetic caoutchouc substance, being a polymerization product of a butadiene hydrocarbon, normally free from resin, containing finely divided albumen distributed intimately throughout its mass incorporated therewith from aqueous colloidal solutions during its production, and containing in small amounts the monomeric butadiene hydrocarbon, and a dimeric polymerid of such hydrocarbon.

22. As a new article of manufacture, a latex-like synthetic caoutchouc substance, being a polymerization product of isoprene, normally free from resin, containing finely divided albumen distributed intimately throughout its mass incorporated therewith from aqueous colloidal solutions during its production, and containing in small amounts unpolymerized isoprene and a dimeric polymerid of isoprene.

23. As a new article of manufacture, a latex-like synthetic caoutchouc substance being a polymerization product of a butadiene hydrocarbon, normally free from resin, containing finely divided egg albumen distributed intimately throughout its mass incorporated therewith from aqueous collodial solutions during its production, and containing in small amounts the monomeric butadiene hydrocarbon, and a dimeric polymerid of such hydrocarbon.

24. As a new article of manufacture, a latex-like synthetic caoutchouc substance, being a polymerization product of isoprene, normally free from resin, containing finely divided egg albumen distributed intimately throughout its mass incorporated therewith from equeous colloidal solutions during its production, and containing in small amounts unpolymerized isoprene and a dimeric polymerid of isoprene.

In testimony whereof I have hereunto set my hand in the presence of two subscribing witnesses.

KURT GOTTLOB. [L. S.]

Witnesses:
HELEN NUFER,
ALBERT NUFER.